(12) United States Patent
Braaten et al.

(10) Patent No.: US 9,366,224 B2
(45) Date of Patent: Jun. 14, 2016

(54) WIND TURBINE BLADE AND METHOD OF FABRICATING THE SAME

(71) Applicant: General Electric Company, Schenectady, NY (US)

(72) Inventors: Mark Edward Braaten, Ballston Lake, NY (US); Anurag Gupta, Manvel, TX (US); Arathi Kamath Gopinath, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 432 days.

(21) Appl. No.: 13/929,220

(22) Filed: Jun. 27, 2013

(65) Prior Publication Data

US 2015/0003994 A1 Jan. 1, 2015

(51) Int. Cl.
*F01D 5/18* (2006.01)
*F03D 1/06* (2006.01)

(52) U.S. Cl.
CPC ............ *F03D 1/0633* (2013.01); *F05B 2240/30* (2013.01); *Y02E 10/721* (2013.01); *Y02E 10/726* (2013.01); *Y10T 29/49337* (2015.01)

(58) Field of Classification Search
CPC ..... F04D 29/384; B64C 11/16; B64C 27/467; F03D 1/0633; F03D 1/001; F03D 1/0641; F03D 1/0675; F03D 1/0683; Y02E 10/721; F05B 2240/30; Y10T 29/49337
USPC .......... 416/237, 223 R, 242, 228, 235, 236 R, 416/236 A, 115, 238
See application file for complete search history.

(56) References Cited

U.S. PATENT DOCUMENTS

| | | | | |
|---|---|---|---|---|
| 4,515,525 | A | * | 5/1985 | Doman ................. F03D 7/0204 416/11 |
| 4,533,297 | A | * | 8/1985 | Bassett ................. F03D 1/0658 416/11 |
| 5,178,518 | A | * | 1/1993 | Carter, Sr. ................. F03D 1/00 416/11 |
| 7,540,716 | B2 | | 6/2009 | Wobben |
| 7,931,444 | B2 | | 4/2011 | Godsk et al. |
| 7,946,826 | B1 | | 5/2011 | Koegler et al. |
| 7,997,875 | B2 | | 8/2011 | Nanukuttan et al. |
| 8,029,241 | B2 | | 10/2011 | McGrath et al. |
| 8,334,610 | B2 | * | 12/2012 | Migliori ................. F01D 17/10 290/44 |
| 2008/0191099 | A1 | * | 8/2008 | Werthmann .......... B64C 23/065 244/199.4 |
| 2010/0290916 | A1 | | 11/2010 | Wobben |
| 2011/0070090 | A1 | | 3/2011 | Hugues |
| 2011/0229331 | A1 | | 9/2011 | Fischer |
| 2011/0255974 | A1 | | 10/2011 | Nanukuttan et al. |

(Continued)

FOREIGN PATENT DOCUMENTS

| | | |
|---|---|---|
| EP | 2383465 A1 | 11/2011 |
| GB | 2065787 A * | 7/1981 ............ F03D 1/0608 |

OTHER PUBLICATIONS

Dossing, "Vortex Lattice Modelling of Winglets on Wind Turbine Blades", Risø National Laboratory, pp. 1-92, Aug. 2007.

(Continued)

*Primary Examiner* — Dwayne J White
*Assistant Examiner* — Jason Mikus
(74) *Attorney, Agent, or Firm* — Armstrong Teasdale LLP

(57) ABSTRACT

A wind turbine blade is provided. The wind turbine blade includes a root region, a tip region, and a body extending from the root region to the tip region. The tip region includes a first winglet and a second winglet that extend arcuately away from one another.

20 Claims, 6 Drawing Sheets

(56) References Cited

U.S. PATENT DOCUMENTS

2012/0027594 A1* 2/2012 Lewke .................. F03D 1/0608
 416/146 R
2012/0312928 A1 12/2012 Gratzer
2013/0259697 A1 10/2013 Herrig et al.

OTHER PUBLICATIONS

Johansen et al., "Aerodynamic Investigation of Winglets on Wind Turbine Blades using CFD", Risø National Laboratory, pp. 1-17, Feb. 2006.
Smith et al., "Performance Analysis of a Wing with Multiple Winglets", Star Technology and Research, pp. 1-11, 2001.
Hau et al., Wind Turbines Fundamentals, Technologies, Application, Economics, 2013, pp. 136-143, Springer.
Imamura et al., Numerical Analysis of the Horizontal Axis Wind Turbine with Winglets, JSME International Journal, 1998, Series B. vol. 41, No. 1, pp. 170-176.
Rechenberg, The Vortex Screw, A New Concept for Wind Power Augmentation, Oct. 22-26, 1984, 1 page, European Wind Energy Conference, Hamburg, Germany.
Shimizu et al., Power Augmentation Effects of a Horizontal Axis Wind Turbine With a Tip Vane—Part 1: Turbine Performance and Tip Vane Configuration, Journal of Fluids Engineering, Jun. 1994, vol. 116, pp. 287-292.
Shimizu et al., Power Augmentation Effects of a Horizontal Axis Wind Turbine With a Tip Vane—Part 2: Flow Visualization, Journal of Fluids Engineering, Jun. 1994, vol. 116, pp. 293-297.
Shimizu et al., Studies on Horizontal Axis Wind Turbines with Tip Attachments, European Wind Energy Conference Proceedings, 1990.
Shimizu et al., Power Augmentation of a Horizontal Axis Wind Turbine Using a Mie Type Tip Vane: Velocity Distribution Around the Tip of a HAWT Blade With and Without a Mie Type Tip Vane, Journal of Solar Energy Engineering, Nov. 1995, vol. 117, pp. 297-303.
Shimizu et al., Rotor Configuration Effects on the Performance of a HAWT With Tip-Mounted Mie-Type Vanes, Journal of Solar Energy Engineering, Nov. 2003, vol. 125, pp. 441-447.
Shimizu et al., Effects of Mie Tip-Vane on Pressure Distribution of Rotor Blade and Power Augmentation of Horizontal Axis Wind Turbine, Proceedings of the 8th International Symposium on Transport Phenomena and Dynamics of Rotating Machinery (ISROMAC—8), Mar. 2000, vol. 1, Honolulu, Hawaii, 8 pages.
http://en.wikipedia.org/wiki/Wingtip_device, 13 pages.

* cited by examiner

US 9,366,224 B2

WIND TURBINE BLADE AND METHOD OF FABRICATING THE SAME

BACKGROUND

The subject matter described herein relates generally to wind turbines and, more particularly, to a wind turbine blade and a method of fabricating the same.

Many known wind turbines include a tower and a rotor mounted on the tower via a nacelle. The rotor includes a number of blades that rotate to drive a generator through a gearbox via a rotor shaft, and the gearbox steps up the inherently low rotational speed of the rotor shaft such that the generator may convert the mechanical energy to electrical energy. However, at least some known wind turbines experience significant losses in annual energy production (AEP) due to aerodynamic inefficiencies of the blades at their respective tips. Moreover, at least some known wind turbines have blades with tips that generate vortices that may adversely affect the operation of downstream wind turbines.

BRIEF DESCRIPTION

In one aspect, a wind turbine blade is provided. The wind turbine blade includes a root region, a tip region, and a body extending from the root region to the tip region. The tip region includes a first winglet and a second winglet that extend arcuately away from one another.

In another aspect, a wind turbine is provided. The wind turbine includes a tower, a nacelle mounted on the tower, and a rotor rotatable relative to the nacelle. The rotor includes a blade having a root region, a tip region, and a body extending from the root region to the tip region. The tip region includes a first winglet and a second winglet that extend arcuately away from one another.

In another aspect, a method of fabricating a wind turbine blade is provided. The method includes forming a body having a root region, and forming a tip region integrally together with the body. The method further includes forming the tip region to include a first winglet and a second winglet that extend arcuately away from one another.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The wind turbine blades set forth below have tip regions that enable tip loss reduction (and vortex dissipation) in a compact fashion so as to minimize turbine loads. As such, the blades provide a significant economic and competitive advantage in the form of increased annual energy production (AEP) for a wind turbine, in addition to reducing the fatigue loading of downstream wind turbines that results from the wake generated by upstream wind turbines in a wind turbine farm.

Figure 1:
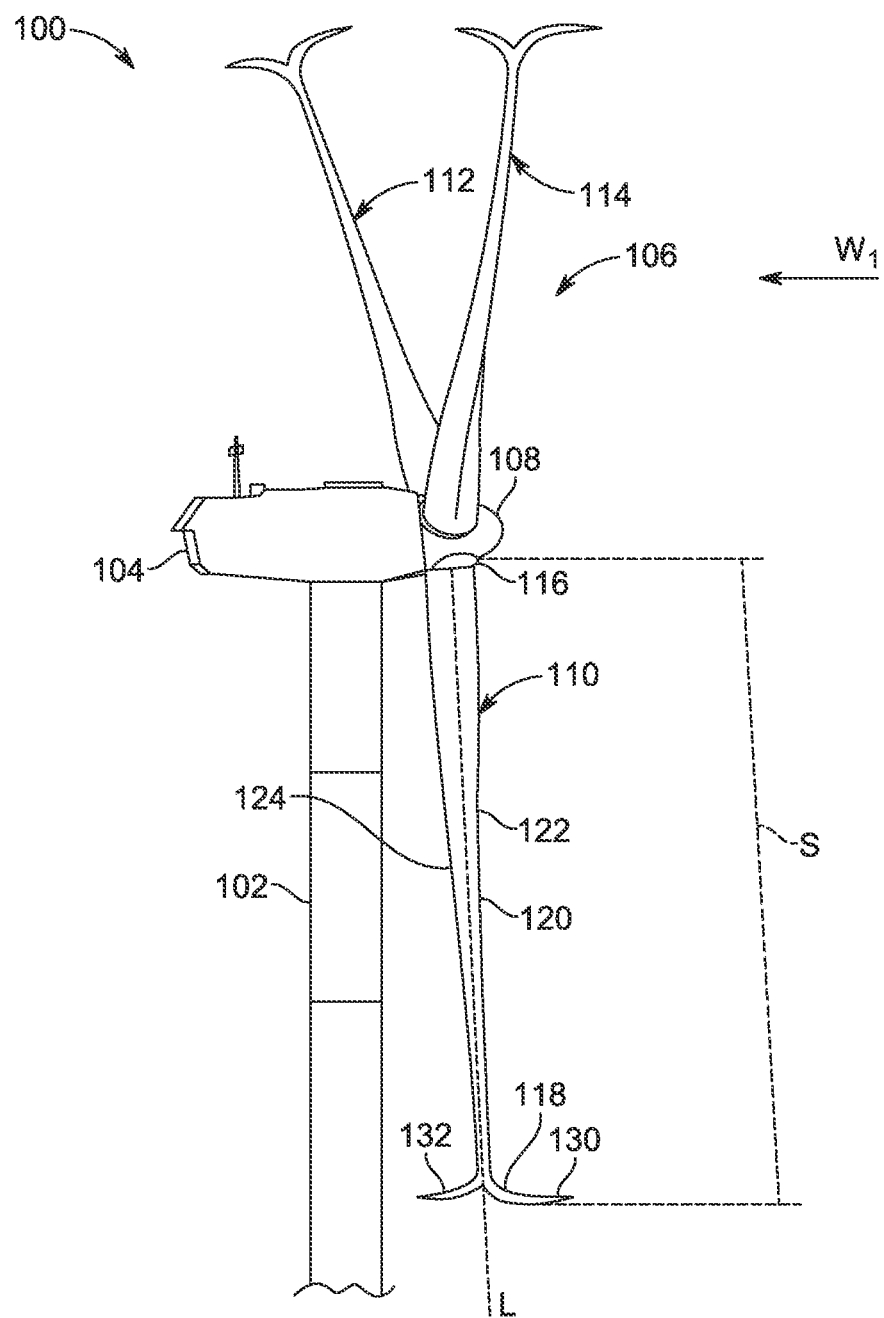
FIG. 1 is a schematic side view of an exemplary wind turbine.
Figure 2:
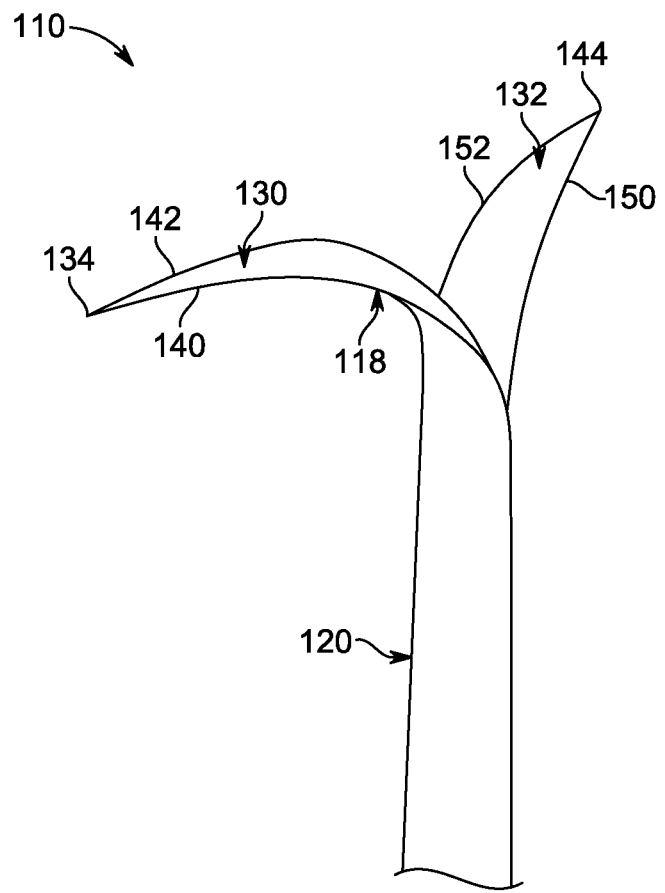
FIG. 2 is a perspective view of an exemplary tip region of an exemplary blade that may be used with the wind turbine shown in FIG. 1.

FIG. 1 is a schematic illustration of a wind turbine 100. In the exemplary embodiment, wind turbine 100 is a horizontal axis wind turbine that includes a tower 102 erected from a foundation (not shown), a nacelle 104 mounted on tower 102, and a rotor 106 that is rotatable relative to nacelle 104. Rotor 106 includes a hub 108 and a plurality of blades extending outward from hub 108, namely a first blade 110, a second blade 112, and a third blade 114 that are substantially equidistantly spaced about hub 108. Each blade 110, 112, 114 has a root region 116, a tip region 118, and a body 120 extending from root region 116 to tip region 118 along a longitudinal axis L. Root region 116 of each blade 110, 112, 114 is suitably configured for operative connection to hub 108 such that, when blades 110, 112, 114 are coupled to hub 108 at their respective root regions 116, each blade 110, 112, 114 has a span S from hub 108. In other embodiments, rotor 106 may include any suitable number of blades 110, 112, 114 spaced any suitable distance from one another about hub 108. Notably, unless otherwise specified herein, the various components shown in FIG. 1 (and FIGS. 2-6) are not intended to be drawn to scale, e.g., some components may be shown as being larger for ease of viewing.

Figure 3:
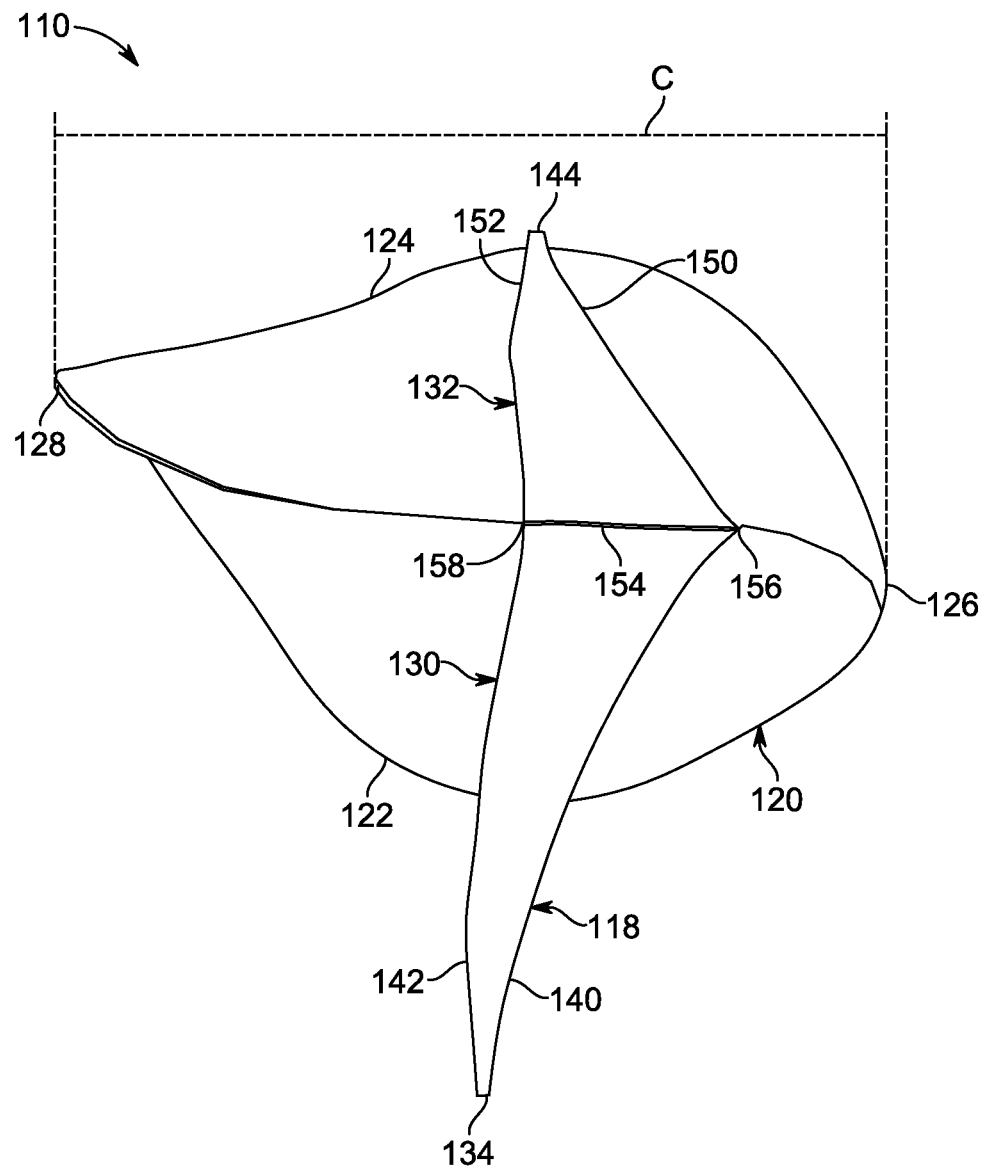
FIG. 3 is an overhead plan view of the tip region shown in FIG. 2.

FIGS. 2-5 are various views of tip region 118 extending from body 120 on first blade 110. It should be noted that, while first blade 110 is described in more detail below, second blade 112 and third blade 114 may be configured in the same manner as first blade 110, e.g., without limitation, second blade 112 and third blade 114 may have respective tip regions 118 and bodies 120 that are configured in the same manner as tip region 118 and body 120 of first blade 110. In the exemplary embodiment, as shown in FIG. 3, body 120 of first blade 110 has a body pressure side 122, a body suction side 124, a body leading edge (or face) 126, and a body trailing edge (or face) 128. Body pressure side 122 and body suction side 124 are joined together at body leading edge 126 and body trailing edge 128 such that body 120 has an airfoil-shaped profile having a chord C. In alternative embodiments, body 120 may have any suitable profile shape that facilitates enabling first blade 110 to function as described herein.

Tip region 118 of first blade 110 includes a first winglet 130 and a second winglet 132 that are formed integrally together with, and branch out from, body 120 of first blade 110 in a split-winglet configuration. More specifically, first winglet 130 extends arcuately from body 120 to a first distal end 134 such that, when first winglet 130 is viewed from the side (as in FIG. 4), first distal end 134 points away from body pressure side 122 in a first direction $F_1$ that is substantially perpendicular to longitudinal axis L. In this manner, the exemplary embodiment of first winglet 130 is said to have a blended profile. First winglet 130 has a first pressure side 136, a first suction side 138, a first leading edge (or face) 140, and a first trailing edge (or face) 142. First pressure side 136 and first suction side 138 are joined together at first leading edge 140 and first trailing edge 142 such that first winglet 130 has an airfoil-shaped cross-section (as shown in FIG. 5). In other embodiments, first winglet 130 may extend linearly (rather than arcuately) from body 120 to first distal end 134. As used herein, the term "formed integrally together" refers to being formed as one piece, e.g., without limitation, via a molding process, and does not refer to being formed as separate pieces that are subsequently joined together, e.g., without limitation, via a bolting or welding process. In that regard, some alternative embodiments of tip region 118 may have first winglet 130 and second winglet 132 being formed as separate pieces from, and coupled to, one another and/or body 120 in any suitable manner. Additionally, as used herein, the term "blended" profile refers to the profile of each winglet merging smoothly with the body of the blade and extending away from the body of the blade along an arcuate path such that a corner is not present at the junction of the respective winglet and the body of the blade.

Similarly, second winglet 132 extends arcuately from body 120 to a second distal end 144 such that, when second winglet 132 is viewed from the side (as in FIG. 4), second distal end 144 points away from body suction side 124 in a second direction $F_2$ that is substantially perpendicular to longitudinal axis L and is substantially opposite first direction $F_1$. In this manner, the exemplary embodiment of second winglet 132 is similarly said to have a blended profile. Second winglet 132 has a second pressure side 146, a second suction side 148, a second leading edge (or face) 150, and a second trailing edge (or face) 152. Second pressure side 146 and second suction side 148 are joined together at second leading edge 150 and second trailing edge 152 such that second winglet 132 has an airfoil-shaped cross-section (as shown in FIG. 5). In other embodiments, second winglet 132 may extend linearly (rather than arcuately) from body 120 to second distal end 144. Notably, in the exemplary embodiment (as shown in FIG. 3), first winglet 130 and second winglet 132 have a generally mirrored extension from body 120. By virtue of being generally mirrored in the exemplary embodiment, first trailing edge 142 and second trailing edge 152 collectively define a substantially undulating trailing edge formation from first distal end 134 to second distal end 144 when first blade 110 is viewed from overhead as in FIG. 3. In alternative embodiments, however, first winglet 130 and second winglet 132 may not be generally mirrored in their extension from body 120. Moreover, in any of the embodiments described herein, the blended profiles of first winglet 130 and second winglet 132 may have any suitable radii of curvature relative to one another, and/or first winglet 130 and second winglet 132 may be configured with different airfoil shapes (or cross-sections), different twist angles, and/or different chord distributions to facilitate maximizing aero-efficiency.

Figure 4:
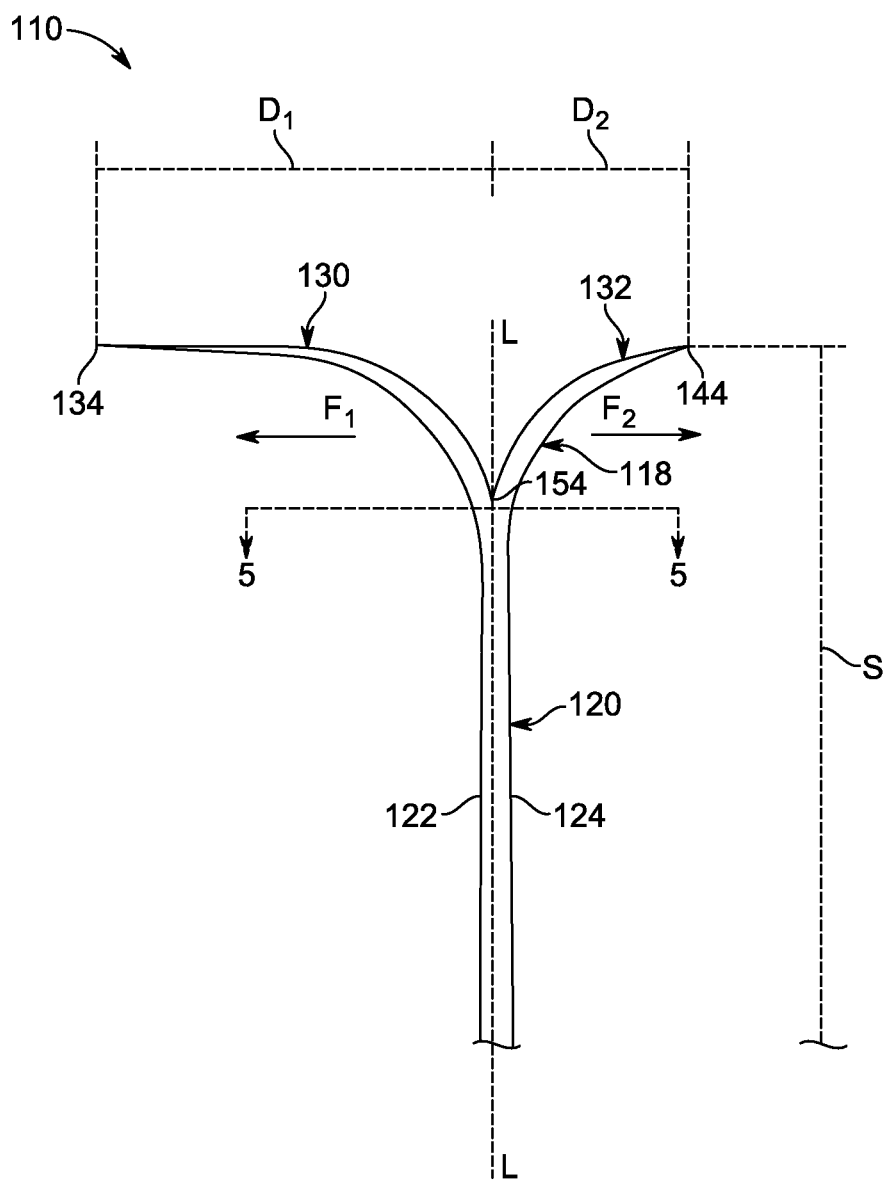
FIG. 4 is a side view of the tip region shown in FIG. 2.
Figure 5:
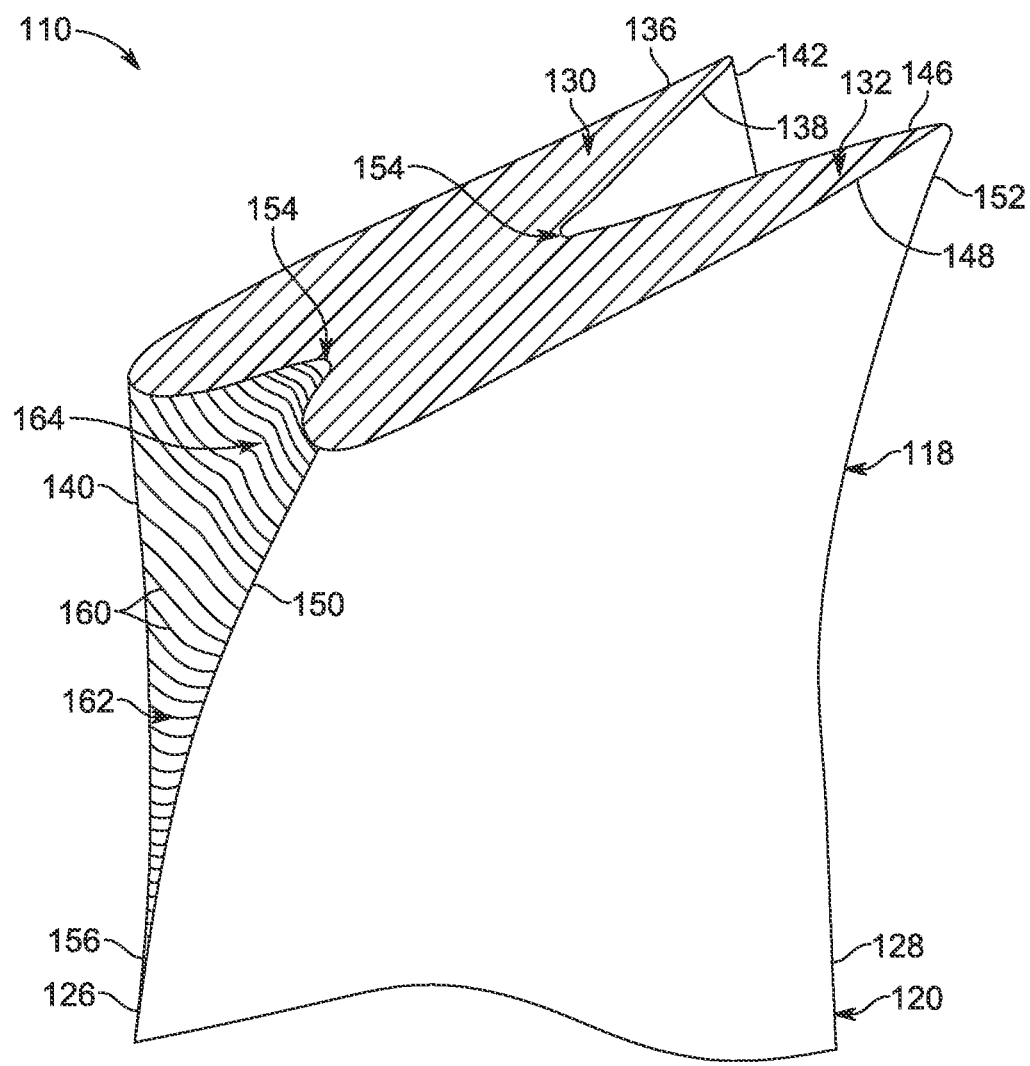
FIG. 5 is a cross-sectional perspective view of the tip region shown in FIG. 2 taken along the plane 5-5 shown in FIG. 4.

In the exemplary embodiment, as shown in FIG. 4, first winglet 130 and second winglet 132 branch out from body 120 at substantially the same location along span S of first blade 110. Additionally, first winglet 130 and second winglet 132 extend from body 120 in a manner that enables first winglet 130 and second winglet 132 to collectively define the extent of span S of blade 110, i.e., first winglet 130 and second winglet 132 have a spanwise component of their extension from body 120 that is substantially the same. In other suitable embodiments, however, first winglet 130 and second winglet 132 may branch out from body 120 at different locations along span S, i.e., first winglet 130 may branch out from body 120 at a location along span S that is farther from root region 116 than the location along span S from which second winglet 132 branches out from body 120. Moreover, in some embodiments, first winglet 130 and second winglet 132 may not extend from body 120 in the manner that they collectively define the extent of span S of blade 110, e.g., without limitation, first winglet 130 may have a spanwise component of its extension from body 120 that is greater than the spanwise component of the extension of second winglet 132 from body 120 such that only first winglet 130 defines the extent of span S of first blade 110.

In the exemplary embodiment, blades 110, 112, 114 are configured such that the pitch of each blade 110, 112, 114 is variable about its respective longitudinal axis L. For example, first blade 110 has a normal operating condition (shown in FIG. 1) at which the pitch of first blade 110 is about 0°, i.e., body suction side 124 is facing toward tower 102, and body pressure side 122 is facing away from tower 102. On the other hand, first blade 110 also has a feather condition at which the pitch of first blade 110 is about 90°, i.e., body trailing edge 128 is facing toward tower 102 and body leading edge 126 is facing away from tower 102. Given that body suction side 124 faces toward tower 102 in the normal operating condition of first blade 110, inhibiting interference between second winglet 132 and tower 102 is desirable. As set forth in more detail below (and shown in FIG. 4), second winglet 132 is therefore configured to extend outward from body 120 a second distance $D_2$ (as measured perpendicular to longitudinal axis L) which is less than a first distance $D_1$ that first winglet 130 extends outward from body 120 (as measured perpendicular to longitudinal axis L). For example, without limitation, first winglet 130 may be about twice as long as second winglet 132 in their outward extension from body 120 as measured perpendicular to longitudinal axis L. Moreover, in the exemplary embodiment, each of $D_1$ and $D_2$ is between approximately 0.03% and approximately 15% of the length of span S. In other embodiments, however, $D_1$ and $D_2$ may be any suitable distances of outward extension (relative to one another or span S) from body 120 that facilitate enabling first winglet 130 and second winglet 132 to function as described herein.

With particular reference to FIG. 5, because first winglet 130 and second winglet 132 branch out from body 120 and extend away from one another in the exemplary embodiment, a seam 154 is defined between first winglet 130 and second winglet 132. More specifically, upon divergence of first winglet 130 from second winglet 132, body leading edge 126 splits into first leading edge 140 and second leading edge 150, and body trailing edge 128 splits into first trailing edge 142 and second trailing edge 152. As such, seam 154 begins at a leading junction 156 of first leading edge 140 and second leading edge 150, and seam 154 ends at a trailing junction 158 (shown in FIG. 3) of first trailing edge 142 and second trailing edge 152, thereby extending transversely across body 120 along an arcuate path from leading junction 156 to trailing junction 158 between first winglet 130 and second winglet 132. Throughout its extension from leading junction 156 to trailing junction 158, seam 154 has a rounded contour between first winglet 130 and second winglet 132. More specifically, in the exemplary embodiment, as illustrated by contour lines 160, the rounded contour of seam 154 has a convex segment 162 near leading junction 156 that smoothly transitions into a concave segment (or fillet) 164 as seam 154 progresses toward trailing junction 158 such that seam 154 is convex at leading junction 156 and is concave at trailing junction 158. Alternatively, the contour of seam 154 between first winglet 130 and second winglet 132 may have any suitable convexity/concavity along its extension from body leading edge 126 to body trailing edge 128, e.g., without limitation, seam 154 may have any suitable contour between first winglet 130 and second winglet 132. As used herein, the term "rounded" contour refers to the contour of the seam being curvilinear and smooth (or free from corners).

During operation of wind turbine 100, blades 110, 112, 114 rotate and generate lift at least in part as a result of their respective bodies 120 being airfoil-shaped. Because each blade 110, 112, 114 has tip region 118, each blade 110, 112, 114 is able to generate additional lift to supplement the lift generated by its respective body 120. In this manner, the lift (and, therefore, the overall power output) associated with wind turbine 100 is increased. Additionally, tip region 118 enables a pair of smaller tip vortices to be shed such that the vorticity dynamics associated with the evolution of the two smaller vortices results in the vortices interacting and subsequently decaying faster than would a single, larger vortex generated by an unsplit blade (or a single winglet).

Figure 6:
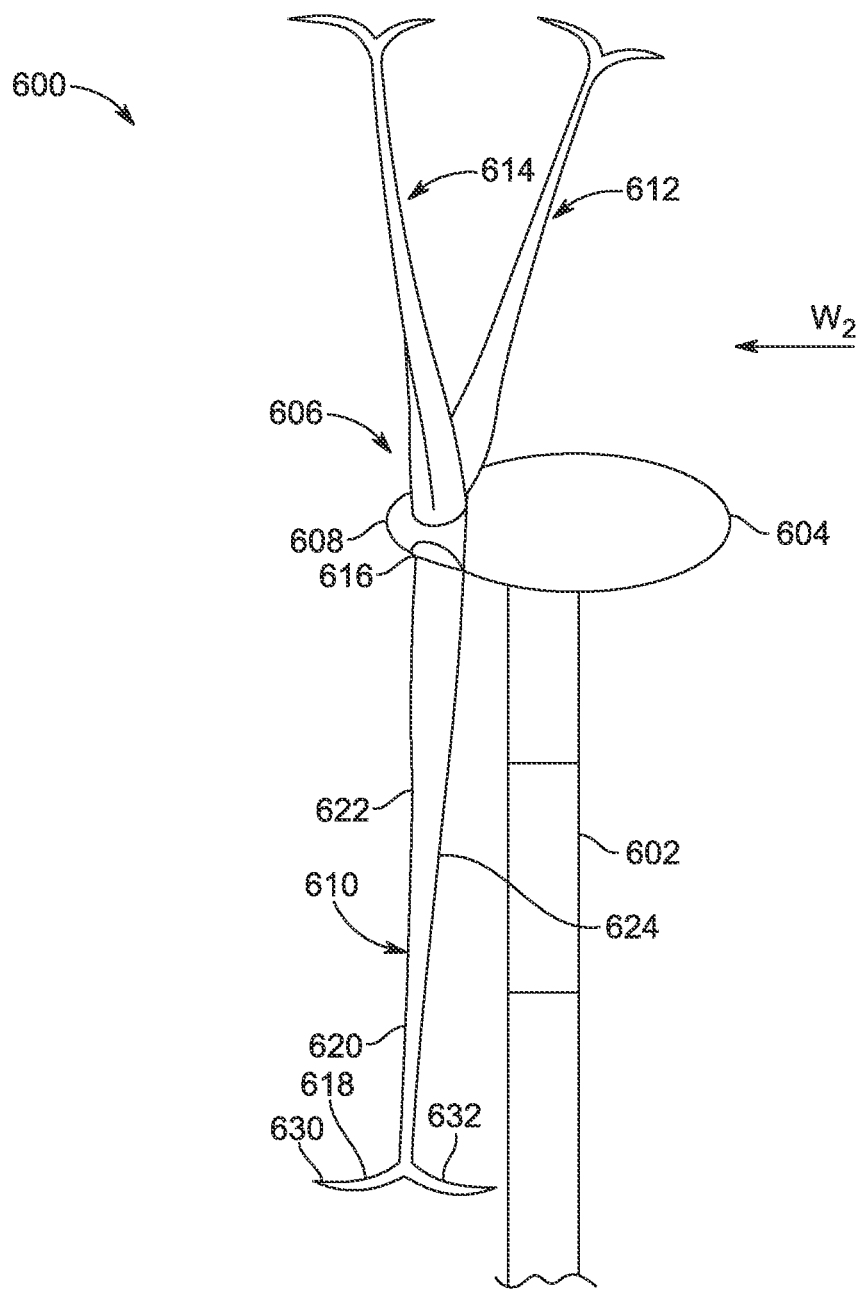
FIG. 6 is a schematic side view of another embodiment of the wind turbine shown in FIG. 1.

Notably, while second winglet 132 (the suction side winglet) is shortened and, hence, has less of a risk of striking tower 102, any resulting loss in aero-effectiveness (or lift) caused by shortening second winglet 132 is recaptured by lengthening first winglet 130 (the pressure side winglet) because first winglet 130 is not at risk of striking tower 102. More specifically, in some embodiments such as the embodiment shown in FIG. 1, wind turbine 100 may be configured such that rotor 106 faces into the wind $W_1$ and is therefore disposed upwind of nacelle 104 during operation. In this case, blades 110, 112, 114 may flex toward tower 102 during operation, and it may be desirable to size second winglet 132 shorter than first winglet 130, i.e., to make $D_2$ less than $D_1$, in order to maximize the operating efficiency of wind turbine 100 while inhibiting interference between second winglet 132 and tower 102. However, in other embodiments such as the embodiment shown in FIG. 6, wind turbine 600 may be configured such that rotor 606 faces away from the wind $W_2$ and is therefore disposed downwind of nacelle 604 during operation. In such a case, blades 610, 612, 614 may flex away from tower 602 during operation, and interference between second winglet 632 and tower 602 is not as likely, meaning that second winglet 632 may be suitably sized to be as long as, or longer than, first winglet 630, i.e., the outward extension of second winglet 632 may be equal to or greater than the outward extension of first winglet 630, in order to facilitate maximizing the operating efficiency of wind turbine 600. In that regard, it may be desirable to provide nacelle 604 with a more aerodynamic contour if rotor 606 is to face away from the wind $W_2$ with nacelle 604 being upwind of rotor 606, as shown in FIG. 6.

The embodiments disclosed herein therefore facilitate providing wind turbines with blades having tip regions that compactly enable tip loss reduction and tip vortex control. Moreover, the embodiments disclosed herein facilitate providing wind turbines with blades that enable an increase in annual energy production (AEP) of the wind turbine, while minimizing the risk of the blades striking the tower of the wind turbine. Additionally, the embodiments disclosed herein facilitate utilizing vorticity dynamics between twin tip vortices to realize faster wake/vortex strength dissipation for downstream wind turbines such that upstream wind turbines less affect the operation of downstream wind turbines and such that the overall power output of the wind farm is maximized. In this manner, the embodiments disclosed herein facilitate providing a significant economic and competitive advantage in the form of increased annual energy production (AEP) for each wind turbine and reduced fatigue loading for downstream wind turbines in a wind turbine farm.

Exemplary embodiments of wind turbine blades and methods of fabricating the same are described above in detail. The blades and methods of fabricating the blades are not limited to the specific embodiments described herein, but rather, components of the blades and/or steps of the methods may be utilized independently and separately from other components and/or steps described herein. For example, the methods may also be used in combination with other systems and methods, and are not limited to practice with only the systems and methods as described herein. Rather, the embodiments may be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine blade comprising:
a root region;
a tip region; and
a body extending from said root region to said tip region, wherein said tip region comprises a first winglet, a second winglet that extends arcuately away from said first winglet, and a seam along which said winglets diverge from one another, said seam having a rounded contour.

2. The wind turbine blade in accordance with claim 1, wherein said first winglet and said second winglet are formed integrally together with said body.

3. The wind turbine blade in accordance with claim 1, wherein said first winglet comprises a first leading edge and a first trailing edge, and wherein said second winglet comprises a second leading edge and a second trailing edge, said wind turbine blade further comprising a leading junction at which said first leading edge diverges from said second leading edge, and a trailing junction at which said first trailing edge diverges from said second trailing edge, such that said rounded contour transitions from being convex at said leading junction to being concave at said trailing junction as said seam extends from said leading junction to said trailing junction.

4. The wind turbine blade in accordance with claim 1, wherein said rounded contour comprises a convex segment and a concave segment.

5. The wind turbine blade in accordance with claim 1, wherein said seam is free from corners.

6. The wind turbine blade in accordance with claim 1, wherein said first winglet extends outward from said body a first distance, and wherein said second winglet extends outward from said body a second distance, the second distance being shorter than the first distance.

7. The wind turbine blade in accordance with claim 6, wherein the second distance is about half of the first distance.

8. A wind turbine comprising:
    a tower;
    a nacelle mounted on said tower; and
    a rotor rotatable relative to said nacelle, wherein said rotor comprises a blade comprising:
        a root region;
        a tip region; and
        a body extending from said root region to said tip region, wherein said tip region comprises a first winglet, a second winglet that extends arcuately away from said first winglet, and a seam along which said winglets diverge from one another, said seam having a rounded contour.

9. The wind turbine in accordance with claim 8, wherein said first winglet and said second winglet are formed integrally together with said body.

10. The wind turbine in accordance with claim 8, wherein said first winglet comprises a first leading edge and a first trailing edge, and wherein said second winglet comprises a second leading edge and a second trailing edge, said blade further comprising a leading junction at which said first leading edge diverges from said second leading edge, and a trailing junction at which said first trailing edge diverges from said second trailing edge, such that said rounded contour transitions from being convex at said leading junction to being concave at said trailing junction as said seam extends from said leading junction to said trailing junction.

11. The wind turbine in accordance with claim 8, wherein said rounded contour comprises a convex segment and a concave segment.

12. The wind turbine in accordance with claim 8, wherein said seam is free from corners.

13. The wind turbine in accordance with claim 8, wherein said wind turbine is operable with said rotor disposed upwind of said nacelle, said body comprising a suction side and a pressure side, wherein said first winglet extends outward from said pressure side of said body a first distance, and wherein said second winglet extends outward from said suction side of said body a second distance, the second distance being shorter than the first distance to inhibit interference between said second winglet and said tower.

14. The wind turbine in accordance with claim 8, wherein said wind turbine is operable with said rotor disposed downwind of said nacelle, said body comprising a suction side and a pressure side, wherein said first winglet extends outward from said pressure side of said body a first distance, and wherein said second winglet extends outward from said suction side of said body a second distance, the second distance being one of the same as and greater than the first distance.

15. A method of fabricating a wind turbine blade, said method comprising:
    forming a body having a root region;
    forming a tip region integrally together with the body; and
    forming the tip region to include a first winglet, a second winglet that extends arcuately away from the first winglet, and a seam along which the winglets diverge from one another, wherein the seam has a rounded contour.

16. The method in accordance with claim 15, further comprising:
    forming the first winglet to have a first leading edge and a first trailing edge;
    forming the second winglet to have a second leading edge and a second trailing edge;
    forming a leading junction at which the first leading edge diverges from the second leading edge;
    forming a trailing junction at which the first trailing edge diverges from the second trailing edge; and
    forming the rounded contour to transition from being convex at the leading junction to being concave at the trailing junction as the seam extends from the leading junction to the trailing junction.

17. The method in accordance with claim 15, further comprising forming the rounded contour to have a convex segment and a concave segment.

18. The method in accordance with claim 15, further comprising forming the seam to be free from corners.

19. The method in accordance with claim 15, further comprising:
    forming the first winglet to extend outward from the body a first distance; and
    forming the second winglet to extend outward from the body a second distance, wherein the second distance is shorter than the first distance.

20. The method in accordance with claim 19, further comprising forming the first winglet and the second winglet such that the second distance is about half of the first distance.

* * * * *